Aug. 4, 1970     L. R. A. BRUN     3,522,728
NAVIGATIONAL INSTRUMENT
Filed Aug. 31, 1967     4 Sheets-Sheet 1
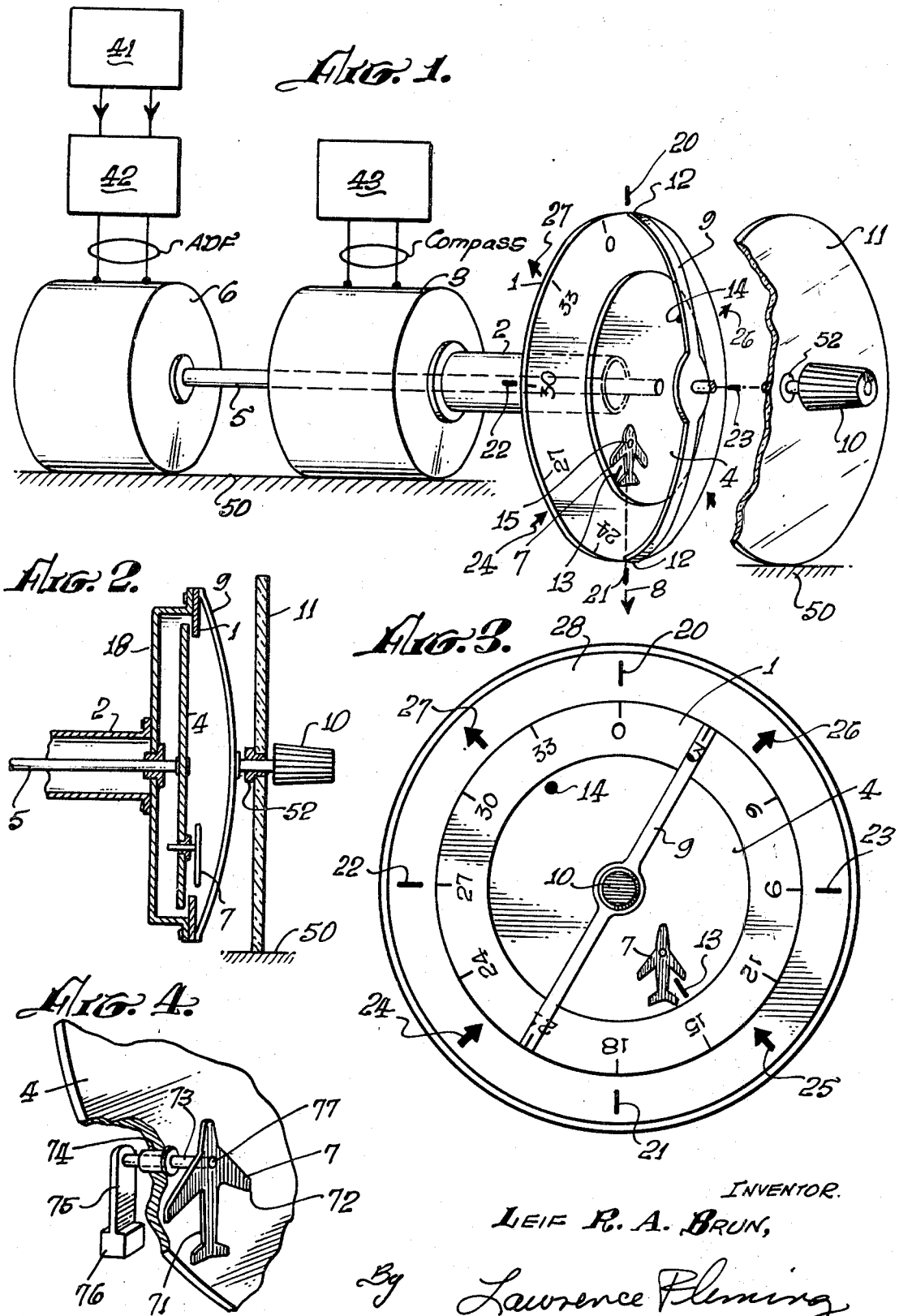
INVENTOR.
LEIF R. A. BRUN,
By Lawrence Fleming
AGENT.

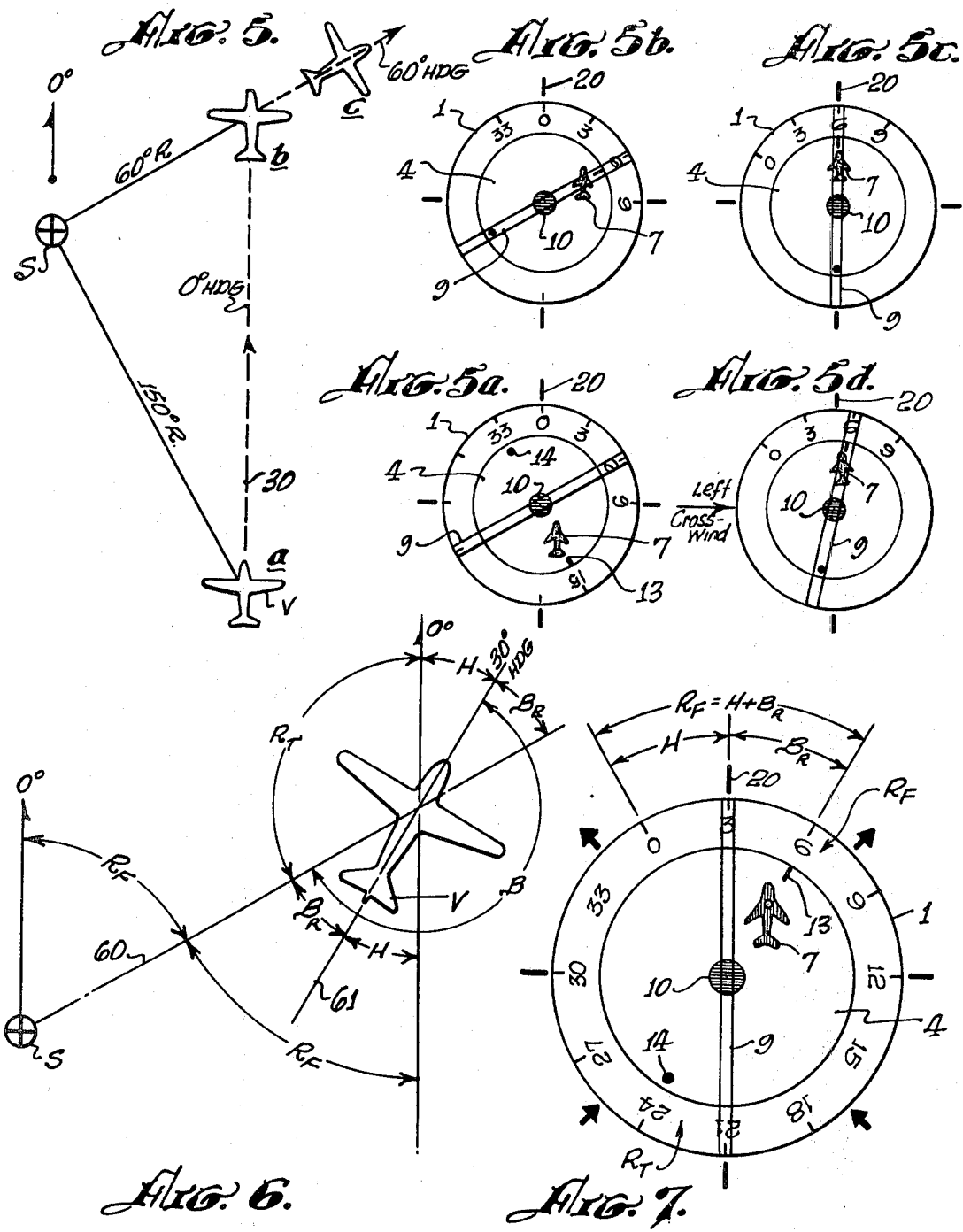

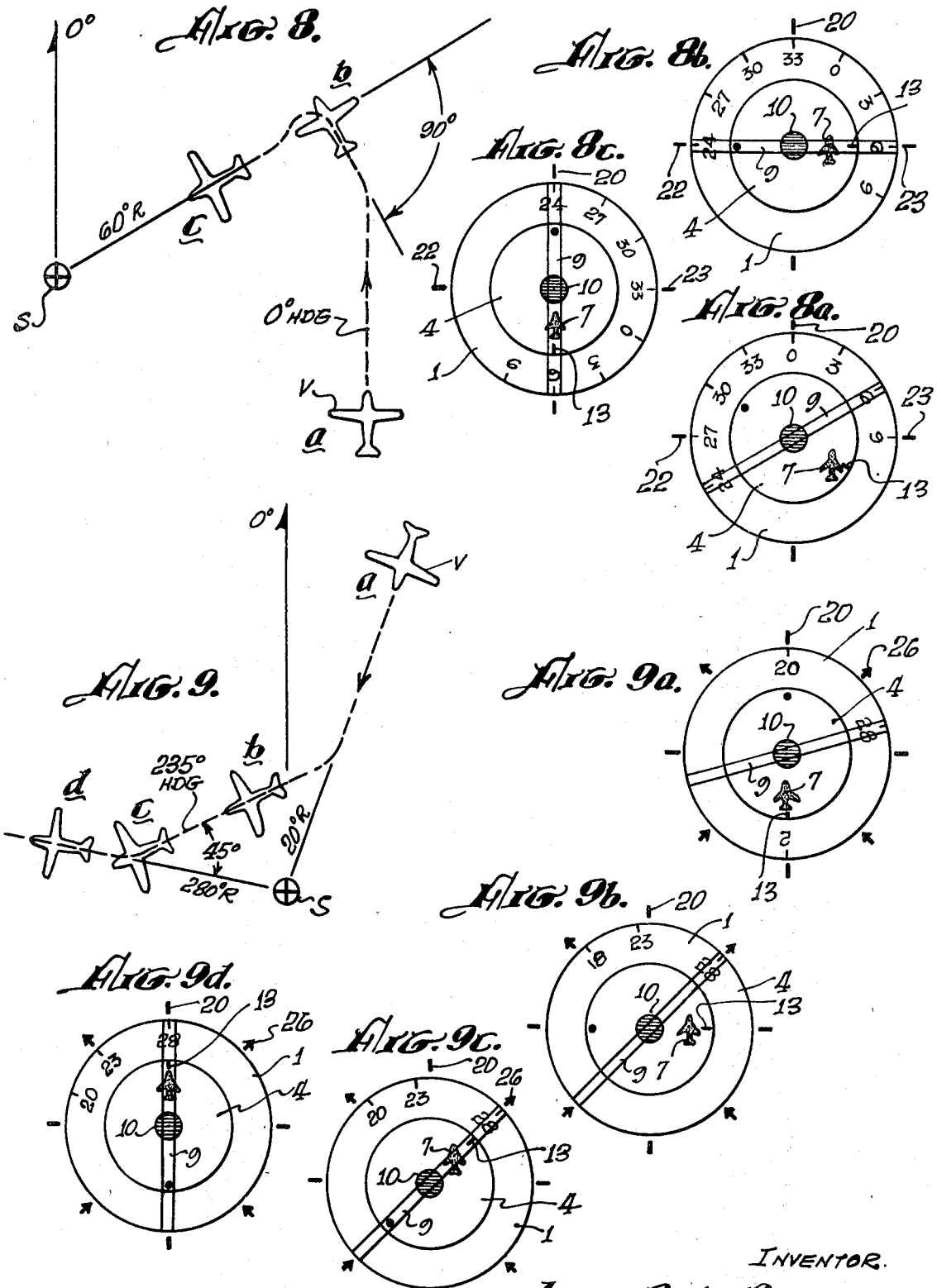

Aug. 4, 1970  L. R. A. BRUN  3,522,728
NAVIGATIONAL INSTRUMENT
Filed Aug. 31, 1967  4 Sheets-Sheet 4

*INVENTOR.*
LEIF R. A. BRUN

# United States Patent Office 3,522,728
Patented Aug. 4, 1970

3,522,728
NAVIGATIONAL INSTRUMENT
Leif R. A. Brun, 7102 Natal Drive,
Westminster, Calif. 92683
Filed Aug. 31, 1967, Ser. No. 664,795
Int. Cl. G01c 21/00
U.S. Cl. 73—178                                    7 Claims

ABSTRACT OF THE DISCLOSURE

An aircraft instrument displaying magnetic heading, bearing from and to a radio station, the present course or a selected future course, and the interception of a radial corresponding to that course. A rotatable azimuth ring positioned according to compass information reads the vehicle's heading against a fixed lubber's mark or index. A diametral course bar turns with this ring, but may be adjusted or set in angular relation thereto. Concentric with the azimuth ring is a disc, angularly positioned by radio direction finder information. In the center of the display is a fixed reference object. Near the rim of the disc is a marker shaped like an airplane silhouette or the like, constrained always to point upward. Adjacent this marker, on the disc, is an index mark. In use, the number on the azimuth ring lying adjacent this index mark is the true radial from the station, i.e., the vehicle's line of position. Interception of a planned radial is displayed by the arrival of the silhouette marker under the course bar. A radial is tracked by setting the course bar and then keeping the silhouette marker under it. The angular relation between the silhouette marker and the central reference object displays the radio bearing. Additional fixed indices on the rim of the instrument are provided to facilitate the interception of predetermined radials at the standard angles of 45° and 90°.

---

This invention relates to instruments for displaying navigational information to pilots of aircraft or other vehicles of the kind that are not confined to roads or tracks, such as desert and swamp vehicles, ground-effect machines, and ships. Prior instrumentation of this class requires the pilot to correlate mentally the displays of several different instruments, and to perform a substantial amount of mental calculation. In an aircraft landing approach, in heavy traffic, or in bad weather, these needs for correlation and computation add to the difficulty of his task, and thus affect the safety of the operation.

The instrument of this invention presents continuously to the pilot, in a single unitary display, the following: the magnetic heading of the vehicle; the bearing from a selected ground or other known station, such as a radio navigation aid, to the position of the vehicle; the angle between said bearing and the heading of the vehicle; and the present or a future course. The relationships between the variables mentioned are clearly represented in a pictorial presentation, which will enable the pilot of the vehicle to readily visualize his navigational situation.

The invention also provides fixed reference indices which facilitate entry into predetermined radials at the usual angles of 45° and 90°, for the purpose of tracking either toward or away from the radio navigation aid, and provides a course bar which normally rotates with the display of the magnetic heading, but may be angularly adjusted with respect thereto.

With these elements combined in the unique manner of this invention in a unitary display, the pilot may, without the need to refer to numerical data or to perform computations, visualize his navigational situation, so that he may intercept any desired track from a radio station at a desired angle of interception and track same with no possibility of ambiguity. The manner of the display presents to the pilot the information that he most needs, in harmony with the normal operation of the human mind.

An object of the invention is to provide a navigational instrument with which a pilot can determine his line of position with respect to a point on the earth, e.g., a radio navigation aid or other station, simultaneously with his magnetic heading, his desired course at the present or a future time, and the rate of change of the vehicle's angular position with respect to that point, without the need for mental computation or for mental correlation of the displays of a plurality of instruments.

In this specification, the term "radio station" means any station of any kind, which apparatus in the vehicle can be made to point toward. Examples in the present state of the art are Radio Broadcasting Stations, VHF Omnidirectional Radio Range (VOR) Stations, and Non-Directional Beacon (NDB) Stations.

It is known to provide an aircraft instrument comprising a rotatable disc slaved to a radio navigation aid, e.g., an ADF (Automatic Direction Finder) receiver, the disc having an airplane silhouette or like marker spaced from its center and constrained always to point in the same direction, e.g., straight up, independently of the angular position of the disc. A portion of the present invention contemplates a rotatable disc having such a marker.

The present invention provides a rotatable disc controlled by radio direction responsive means and carrying a marker spaced from its center, in combination with a rotatable compass azimuth display and a course bar, together with fixed reference indices. The course bar is normally maintained automatically in a fixed angular relation to the compass azimuth display, but is adjustable by the pilot in angular relation thereto.

In the drawings:

FIG. 1 is a partially-diagrammatic perspective view of the essential elements of a form of the invention;

FIG. 2 is a cross-sectional view of a portion of a modification of FIG. 1;

FIG. 3 is a front view of the face of an instrument according to the invention;

FIG. 4 is a partially cut-away perspective view of a form of a detail of the invention, the marker device;

FIG. 5 is a geometric diagram of an illustrative navigational problem which may be solved by using the invention;

Figure 10:
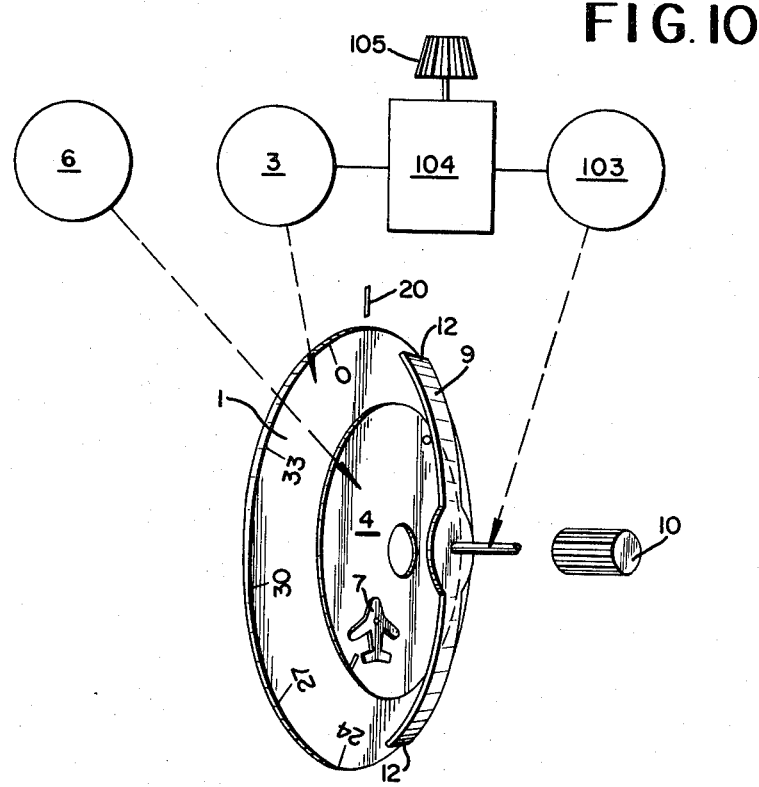

FIGS. 5a, 5b, and 5c are simplified views of the instrument face display at selected points in the solution of the problem of FIG. 5;

FIG. 5d is a simplified instrument face view in a situation similar to point c of FIG. 5, but with a cross-wind component;

FIG. 6 is a geometric diagram illustrating the functioning of the invention in computing radials from stations;

FIG. 7 is a simplified view of the instrument face illustrating the computational function in connection with FIG. 6;

FIG. 8 is a diagram of a navigational problem illustrating the use of the fixed reference indices facilitating interception of a radial at 90°;

FIGS. 8a, 8b, and 8c are simplified showings of the instrument face at selected points in the solution of the problem of FIG. 8;

FIG. 9 is a diagram of a navigational problem illustrating the use of the fixed reference indices facilitating interception of a radial at 45°; and FIGS. 9a, 9b, 9c, and 9d are simplified showings of the instrument face at selected points in the solution of the problem of FIG. 9. In all the figures, the same reference numerals indicate corresponding elements.

Figure 11:
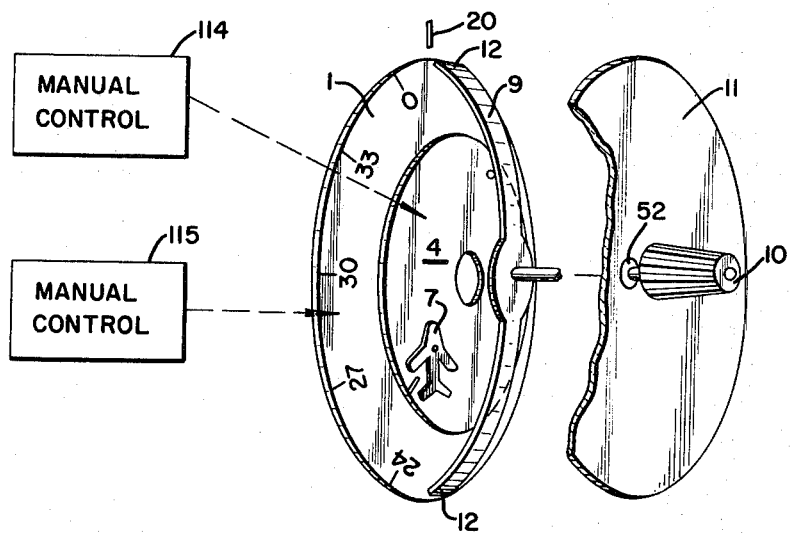

FIGS. 10 and 11 are semi-diagrammatic showings of alternative control or positioning means applied to the display structure of FIGS. 1 or 3.

Referring more particularly to the figures, FIG. 1 is a partially cut-away perspective view showing semi-diagrammatically the essential features of the structure of a foam of the invention. A rotatable element 1 is marked to indicate vehicle heading, like a compass card, and is here called an azimuth display. This azimuth display or ring 1 is coupled to a synchro motor, servo motor, or other positioning device 3 through means such as a hollow shaft 2. Positioning device 3 is controlled in response to a magnetic, gyro, or other type of compass, indicated generally by a block 43. In some embodiments of the invention, the azimuth display 1 may be manually positioned to correspond with the compass heading of the vehicle, and positioning device 3 omitted.

Concentric with the azimuth display 1 is a disc 4, whose angular position is controlled by a second synchro motor, servo, or other positioning device 6, through a shaft 5 passing through hollow shaft 2 or by other known means. Positioning device 6 is controlled in response to radio directional information fed from sources indicated generally as blocks 41 and 42. Block 41 may be an omnidirectional Radio Range (VOR) receiver and block 42 a converter to convert the VOR signal output into information of the automatic direction-finder (ADF) type. Alternatively, block 41 may represent an ADF receiver, with block 42 omitted. The converting device 42, if used, may be of any type, electronic or mechanical.

Positioning device 6 and elements 41 and 42 may be omitted, and the disc 4 positioned manually in accordance with the output of direction-finding apparatus.

Mounted on a radius of disc 4 is a marker 7 in the shape of an airplane silhouette or other suitable object suggestive of direction. The marker 7 is pivoted to the disc 4 at a point such as 15, FIG. 1, and is constrained substantially to point always upward (indicative of "straight ahead"), regardless of the angular position of the disc 4 on which it is carried. This directional constraint is indicated schematically by a dotted arrow 8. It may be effected by any known means, such as three gears, or toothed belts or chains and sprockets, or magnetic means, or by gravity.

There is also provided a course bar 9, substantially diametral to the instrument face, which normally rotates synchronously or together with compass azimuth display 1, as by frictionally engaging said display or ring 1 at points 12, FIG. 1. Course bar 9 may, however, be manually set or adjusted by an override device to any desired angular relation with respect to ring 1, which angular relation it will then maintain until it is manually adjusted again. One means for doing this is to provide a knob 10 connected to the middle of course bar 9 through a short shaft which protrudes through the front window 11 of the instrument, through a low-friction bearing 52. Alternatively, the course bar 9 and azimuth display 1 may be positioned by individual synchros fed from the same source to maintain their synchronism, and the adjusting or override function accomplished by known electrical means inserted between the source and the synchro that positions the course bar.

FIG. 10 illustrates semi-schematically such use of three synchros. All elements are the same as in FIG. 1 except for the additional synchro or positioning device 103, an electrical differential adjusting device 104, and its manual control knob 105. Mechanical connections or drives from positioning devices 6, 3, and 103 to their respective display elements 1, 4, and 9 are indicated by dotted lines with arrowheads. The phase relation between the mechanical outputs of devices 3 and 103 may be set by manual knob 105 via an electrical phase shifting or other suitable device 104 of known type. Reference object 10 may be a stationary mark or button. The ends 12 of course bar 9 need not, here, engage frictionally the azimuth ring 1.

A primary function of the knob 10 is to represent symbolically or graphically the location of the radio navigation aid station being utilized. The relationship between the marker 7 and the knob 10 will pictorially display the bearing of the station from the vehicle.

In some embodiments of the invention the course bar 9 may be positioned by means not located in the center of the display, e.g., a knob at the side, or by a synchro. However, a knob 10 or other visible reference object will always be required in the center of the display, to symbolize the location of the station.

The course bar 9 may be made of resilient sheet metal, or of strip-like transparent material, or be a line or lines marked on a transparent disc or the like; it need only be a visible bar-like diametral element, positioned and adjusted as described, which does not objectionably obscure the scales, marker, and other necessary indices.

FIG. 2 shows a cross-sectional view of a portion of a structural modification of the invention. In this modification, the azimuth display 1 is in the form of a ring, and the disc 4 is positioned in back of it instead of in front, as shown. The azimuth display 1 may be supported by a hollow dish-like member 18 by screws or other fastenings, to permit assembly. Hollow shaft 2 may be fastened to the back of member 18, and the smaller shaft 5 pass through a bearing in the center of member 18, and carry on its end the disc 4. Course bar 9 may frictionally engage azimuth display 1 at its ends. The center of course bar 9 may be affixed to a shaft which passes through a bearing 52 in the front window 11, and terminates in knob 10.

Conventional symbols 50 denoting "ground" are used in FIGS. 1 and 2 to denote elements which are normally stationary.

FIG. 3 illustrates the general appearance of the face of an instrument according to the invention. The stationary rim portion of the instrument case is indicated at 28. Inside it is the compass azimuth display or ring 1 and substantially concentric with this, the radio directional information disc 4, which carries the marker 7 and indices 13 and 14.

The number on azimuth display 1 adjacent stationary index 20 is the magnetic heading of the vehicle. The number on azimuth display 1 adjacent index 13 represents the radial from the station on which the vehicle's position lies. The number on azimuth display adjacent index 14 represents the magnetic heading from the vehicle to the station. Arrival of marker 7 under course bar 9 indicates interception of a radial.

Additionally to the index 13 adjacent marker 7 and index 14 opposite, or 180° from, marker 7, FIG. 3 shows a set of reference indices 20 through 27 on a stationary part of the instrument, such as the case rim 28. These reference indices are aids for the interception and tracking of radials to and from radio stations, and their functions will be explained in connection with the illustrative navigational problem examples in later figures of the drawings. References indices 20 and 21 are for tracking a radial; indices 22 and 23 are for facilitating interception of a radial at 90°; directional reference indices 24 and 25 are used in interception of radials at 45° for the purpose of moving toward the station; directional indices 26, 27 are for intercepting radials at 45° for the purpose of moving away from the station.

FIG. 4 illustrates one means for supporting the marker 7 and constraining it always to point substantially upward, by using gravity. Marker 7 may be made in a shape suggestive of an airplane silhouette, with swept-back wings whose tips 72 are substantially below the pivot point 77, so that its center of gravity is well below that pivot. Additionally, pivot shaft 73, passing through bearing 74 in disc 4, may carry at its back end a pendulum 75 weighted as at 76, to increase the pendulosity of the assembly. To facilitate the readability of the display, the fuselage portion 71 of marker 7 may be made approximately the same width as the course bar 9 (FIGS. 1–3).

Referring again to FIGS. 1 and 3, following is a brief description of information that the instrument displays to the pilot, and how:

(1) Magnetic heading is shown by the number on the azimuth display 1 opposite index 20. In FIG. 3 it is 0°.

(2) Angular relation or bearing between vehicle heading and the line from radio station to vehicle is shown graphically or pictorially by the angular relation between silhouette marker 7 and the knob or other central reference object 10. It is important to note that object 10 represents graphically the radio station, and marker 7 the vehicle. Thus, if marker 7 is directly below 10, the vehicle is headed directly toward the station; if marker 7 is alongside 10, the vehicle is abeam of the station; if marker 7 is directly above the object 10, the vehicle is proceeding directly away from the station. In the specific showing of FIG. 3, the station is to the left of the present heading.

(3) The radial from the station on which the vehicle's position lies is given by the number on the azimuth display scale adjacent the index mark 13. In FIG. 3 it is 150°. This is further explained later.

(4) The magentic heading from the vehicle to the station is given by the azimuth display number adjacent the index 14, in FIG. 3 it is 330°.

In this specification, courses and headings are termed "magnetic" where appropriate, because aeronautical charts and radio navigation aids are referenced to local magnetic north.

The manner in which the instrument computes and displays the radial of position, regardless of magnetic heading, will be described later in connection with FIGS. 6 and 7.

FIG. 5 is a diagram of a navigational problem illustrating the functioning of the invention. The vehicle V is assumed to be initially at point a, headed at 0°, and is required to proceed on this 0° heading until it intercepts the 60° radial from the radio station S, and then to turn, and track this 60° radial outbound from station S. In all the figures, radials are labeled "R," as "60° R," and vehicle headings are labeled "HDG."

FIG. 5a illustrates the essentails of the instrument face when the craft is at point a of FIG. 5. Azimuth display 1 shows, adjacent index 20, the magnetic heading of 0°. Course bar 9 has been set at the future course of 60°. Marker 7 shows that the station is ahead and to the left. Index 13 is adjacent the number 15 on the azimuth scale, showing that the vehicle is at that moment on the 150° radial from station S. Index 14 is opposite number 33 on the azimuth scale, showing that the magnetic course to the station is 330°, the reciprocal of 150°.

FIG. 5b shows the relevant features of the instrument display at point b of FIG. 5, when the 60° radial from station S has been intercepted. The fact of interception is shown by the fact that marker 7 is directly underneath course bar 9. It is now time to make the turn.

FIG. 5c shows the relevant features of the display at a point such as c of FIG. 5, after the turn has been made onto the new track. The azimuth display reading of 6 adjacent index 20, shows that the new heading of 60° is being made good. The position of marker 7 directly above the center knob or object 10 and directly under the course bar 9, shows that the vehicle is tracking directly away from station S, as planned.

The presentation as described will be true in a condition of zero drift. When cross wind conditions are present, however, it is necessary to head the vehicle at an angle to the course.

FIG. 5d illustrates the relevant features of the instrument display when the vehicle is tracking a 60° radial outbound, as it is at c of FIG. 5, but with a cross wind component from the left. In contrast to the no-drift presentation of FIG. 5c, the vehicle in FIG. 5d has been headed several degrees left of the 60° course to compensate for the left cross wind. The actual heading is the azimuth scale reading adjacent index 20. The fact that the vehicle is on the 60° course is displayed by the position of the marker 7 directly under the course bar 9. In order to keep on the 60° radial, it is merely necessary to head the vehicle so that the marker 7 stays under the course bar. It is evident that reference to numerical data and calculations is unnecessary; the technique is to "fly the picture," i.e., keep the marker under the course bar.

FIG. 6 is a diagram illustrating the geometric relations between vehicle heading, bearings to and from a radio station S, and the station radial on which the vehicle's position lies.

FIG. 7 illustrates the essentials of the instrument face display corresponding to the diagram of FIG. 6.

In FIG. 6, the vehicle V is shown on a radial 60 from station S, the angle between radial 60 and 0° (North) being designated $R_F$ (radial from). As is known in the navigation art, the magnetic course to the station, $R_T$, as measured from the vehicle, is the reciprocal of $R_F$, or $R_F + 180°$.

The heading of vehicle V is the angle between its own axis 61 and 0°, and is designated H.

The bearing to the station S as measured from the vehicle is designated B. This is the angle that would be indicated by conventional radio direct-finding equipment. In the present invention and in radio navigation practice, it is more convenient to refer primarily to radials as being *from* a station, rather than their reciprocals, the magnetic courses *to* the station. Accordingly, in FIG. 6 we plot the reciprocal of angle B, and designate the reciprocal $B_R$. This is the angle between the vehicle's heading H and the radial 60 from the station. As an example, if the vehicle were moving outbound along radial 60 (tracking it outbound), angle $B_R$ would be zero.

In FIG. 6, the projections of angles $B_R$ and H are labeled similarly to the original angles. By geometry, it follows from FIG. 6 that $$<R_F = <H + <B_R$$

i.e., that the radial from station S on which the vehicle's position lies, is the sum of the heading and the reciprocal bearing.

The reciprocal bearing $B_R$ can be obtained from direction-finding equipment.

FIG. 7 illustrates how the instrument of the invention performs the angle-summing operation to display the radial of position from direction finder (bearing) and compass (heading) data inputs, without requiring the use of the more complicated omnidirectional radio range technology. To depict this example more clearly, the instrument face in FIG. 7 depicts the same navigational situation as FIG. 6, the angles H and $B_R$ being shown as approximately 30° and $R_F$ as approximately 60°. In FIG. 7, the azimuth display 1 shows the magnetic heading of 30° (last digit omitted, as is usual in aircraft instruments), adjacent index 20. The disc 4 has been positioned by the radio direction finder information to an angle equal to the reciprocal bearing $B_R$. The sum of these two angles of rotation H and $B_R$ is now displayed by the instrument as the number on azimuth display 1 which lies adjacent the index 13 on disc 4, i.e., 60°. This is the radial $R_F$ from the station on which the vehicle's position lies. In addition, the dot index 14 is positioned adjacent "24" on azimuth display 1, giving correctly the magnetic course from the vehicle to the station S as 240° (angle $R_T$ in FIG. 6). Thus the instrument of the invention extracts the maximum of needed information from a minimum of basic data, and displays it in a clear and unambiguous manner.

FIG. 8 is a diagram of a navigational problem requiring the use of the 90° course intercept indices 22 and 23. The vehicle V is headed at 0°, and is required to intercept the 60° radial from station S at 90°, and then fly inbound along that radial. The two usual angles of interception, in aviation practice, are 45° and 90°.

FIG. 8a shows the relevant elements of the instrument face display when the craft is at point a of FIG. 8. FIG 8b shows these elements at point b of FIG. 8, and FIG. 8c shows them at point c of FIG. 8.

In FIG. 8a, the azimuth display shows the heading of 0° adjacent index 20. Marker 7 shows that station S is ahead and to the left. At this time the course bar 9 would be set to the radial to be intercepted, 60°. The instrument presentation makes it apparent that the vehicle must be turned to the left in order to intercept the desired radial at the prescribed angle of 90°. In order to accomplish this, the vehicle will be turned left until the course bar is aligned with and opposite the 90° course intercept index 23. The turn will then be stopped and that heading maintained to complete the interception.

Following this procedure, FIG. 8b shows the essentials of the instrument display at the time of interception, point b. The vehicle has been turned so that course bar 9 is opposite the 90° intercept index 23; and the position of marker 7 shows that the vehicle is directly abeam of the station. That is, the marker 7 has now arrived under the course bar 9, indicating that the interception is now complete.

FIG. 8c shows the display after interception and during tracking of the magnetic course toward the station (point c of FIG. 8). Marker 7 is now pointing directly toward central reference object 10, indicating that the vehicle is tracking toward the station. Index 13 is adjacent "6" on the azimuth display, indicating that the 60° radial from the station is being tracked. Index 14 is opposite "24," indicating that the magnetic course to the station is 240°, which is also in this case the magnetic heading.

It will be seen that this intercept procedure is accomplished without the necessity of mental calculations normally required in fixed angle interception problems. The unique and graphic manner of presentation of the navigational elements shown by the means of this invention, reduces the necessity, to a large extent, for referring to numbers. During all navigation problems using this invention, the pilot will soon learn, in essence, to "fly the picture."

FIG. 9 is a diagram of a navigational problem requiring the use of the 45° intercept indices. The vehicle V is headed at 200°, directly toward station S, as at point a. It is required to intercept the 280° radial from station S at an angle of 45°, as at point c. Point b is at an intermediate stage of the problem. After intercepting the 280° radial, at c, it is required to track this radial outbound from the station S, as shown at d. FIGS. 9a, 9b, 9c, and 9d show the relevant elements of the instrument display at these respective points in the solution of the problem.

In FIG. 9a, the initial heading of 200° is displayed on azimuth display or ring 1 adjacent index 20. Course bar 9 has been set to the future course of 280°. Marker 7 shows that the craft is tracking toward station S (represented by object or knob 10). Index 13 is adjacent "2" on azimuth display 1, showing that the craft is tracking inbound toward the station, on the 20° radial from the station.

FIG. 9b shows the essentials of the display at an intermediate point b of the problem of FIG. 9. At this point, a turn has been made to put the craft on the correct heading to intercept the 280° radial at an interception angle of 45°, and the course bar 9 shows this: it is now over the 45° intercept index 25. At this point, the station S is abeam of the vehicle. Marker 7 indicates this, and also shows that the 280° radial has not yet been intercepted.

FIG. 9c shows the display at point c of FIG. 9, the point where the intercept has occurred. Similarly to FIG. 8c, the marker 7 has now arrived under the course bar, indicating that the interception has been accomplished. The heading, however, is still that required to make the intercept at 45°, as in FIG. 9b, i.e., 280°–45° or 235°.

FIG. 9d shows the relevant elements of the instrument display at a point such as d, after the turn has been made to tracking outbound. The marker 7 is now directly above the central reference object or knob 10, indicating that the craft is tracking directly away from the station S; and the correct heading of 280° is displayed by "28" on azimuth ring 7 being adjacent index 20.

It will be seen that the radial intercept procedure may be summarized as follows:

(1) Set course bar to number on azimuth ring corresponding to the radial to be intercepted;

(2) Turn the vehicle until the course bar points to the desired intercept index;

(3) Continue on that heading until the marker 7 reaches the course bar. The intercept is now complete.

Referring back to FIGS. 1–4, it is evident that the azimuth display or ring 1 may be adapted to be rotatably positioned by manual means, copying the reading of a conventional compass of any type, without departing from the spirit of the invention. It is also evident that the disc 4 may be adapted to be rotated manually to copy or follow radio directional information within the spirit of the invention, so that the navigational instrument of the invention may be made as a portable device.

FIG. 11 illustrates such an embodiment semi-schematically. The structure shown is the same as in FIG. 1, except for boxes 114 and 115, which indicate any suitable types of manual control or positioning devices for the disc 4 and the azimuth ring 1, respectively. Devices 114 and 115 may be knobs, linked to the ring 1 and the disc 4 by means of belts or gears.

I claim:

1. As instrument to provide a composite navigational information display to the pilot of a vehicle, comprising:
   a rotatable azimuth ring positioned by compass means and displaying the heading of the vehicle in reference to a fixed index mark,
   a course bar extending substantially across the full diameter of said ring and connected so as to normally rotate with said ring,
   manually-controlled override means to set the angular relation of said bar to said ring,
   a rotatable disc concentric with said ring,
   direction-finder means to position said disc according to the bearing of a fixed station,
   a fixed central reference object symbolizing said station,
   a marker of a directional shape, symbolizing said vehicle, pivotally mounted on a radius of said disc with means to constrain it to point always in the same direction,
   and an index mark on said disc adjacent said marker and disposed to point to a reading on said azimuth ring,
   said reading indicating the radial from said station on which the vehicle's position lies,
   the arrival of said marker under said course bar indicating that said vehicle has intercepted the radial from said station corresponding to a course to which said bar is set,
   and the relative position of said marker and said reference object displaying pictorially the bearing of said station.

2. The instrument of claim 1, further comprising:
   another index mark on the rim portion of said disk, 180° from said index,
   indicating on said azimuth ring the magnetic course to said station.

3. The instrument of claim 1, further comprising:
   a case having a rim portion marked with;
      a pair of tracking indices at the 0° and 180° positions,
      a pair of 90° course intercept indices at the 90° and the 270° positions,
      a pair of 45° outbound course intercept indices at the 135° and 315° positions, and having a directional shape, and a pair of 45° inbound course intercept indices at the 135° and 225° positions, and having a directional shape, the alignment of said course bar with a chosen one of said indices indicating that the heading is correct for interception of a station radial, to which said bar is set, at an angle corresponding to the chosen intercept index.

4. The instrument of claim 1, wherein:

said compass means further comprises a compass-controlled first electrical positioning device rotatably connected to said azimuth ring, and said direction-finder means comprises a radio direction finder and a second electrical positioning device controlled thereby to angularly position said disc.

5. The instrument of claim 4, wherein:

said course bar is driven by a third electrical positioning device in synchronism with said first positioning device, and said override means comprises a manually-controlled electrical differential control element connected electrically between said third positioning device and said first positioning device.

6. A navigational instrument for a vehicle comprising:

a rotatable azimuth display, compass means to angularly position said display to the magnetic heading of said vehicle, a course bar, means to angularly position said course bar normally in synchronism with said display, override means to adjust manually the angular relation between said course bar and said azimuth display, a rotatable disc carrying a marker symbolizing said vehicle, direction finder means adapted to angularly position said disc in accordance with the bearing of a selected station, and a central reference object, the adjacency of said marker to a point on said azimuth display indicating on said display the direction of the radial from said station on which said vehicle's position lies, and the position of said marker relative to said course bar and reference object displaying respectively the vehicle's heading with respect to the set course, and the bearing of the station, said course bar being of resilient material, its end portions frictionally engaging said azimuth display, and the center portion of said course bar being connected to an adjusting knob in the center portion of the instrument face, said knob serving as said central reference object.

7. An instrument according to claim 1, wherein:

manual means are provided to position said azimuth ring in accordance with the reading of a compass, and manual means are provided to angularly position said disc in accordance with the indication of a radio direction finder.

References Cited

UNITED STATES PATENTS

| | | | |
|---|---|---|---|
| 1,715,270 | 5/1929 | Bassett | 33—224 |
| 2,323,337 | 7/1943 | Lear | 33—224 XR |
| 2,588,433 | 3/1952 | Twamley | 33—224 |

DONALD O. WOODIEL, Primary Examiner

U.S. Cl. X.R.

33—224; 35—10.2; 116—129, 133; 235—150.26; 340—26